US012744351B2

(12) United States Patent
Wolter et al.

(10) Patent No.: US 12,744,351 B2
(45) Date of Patent: Sep. 22, 2026

(54) GROUNDING DEVICE, GROUNDING UNIT, CONTACT INSERT AND ELECTRICAL PLUG CONNECTOR, AND METHOD FOR PRODUCING A CONTACT INSERT

(71) Applicant: Franz Binder GmbH + Co. Elektrische Bauelemente KG, Neckarsulm (DE)

(72) Inventors: Martin Wolter, Talheim (DE); Matthias Jürgen Kassner, Neckarsulm (DE)

(73) Assignee: Franz Binder GmbH + Co. Elektrische Bauelemente KG, Neckarsulm (DE)

( * ) Notice: Subject to any disclaimer, the term of this patent is extended or adjusted under 35 U.S.C. 154(b) by 580 days.

(21) Appl. No.: 18/305,031

(22) Filed: Apr. 21, 2023

(65) Prior Publication Data

US 2023/0344175 A1 Oct. 26, 2023

(30) Foreign Application Priority Data

Apr. 25, 2022 (DE) ..................... 10 2022 203 986.6
Mar. 30, 2023 (EP) ..................................... 23165378

(51) Int. Cl.
*H01R 13/648* (2006.01)
*H01R 13/24* (2006.01)
(Continued)

(52) U.S. Cl.
CPC ....... *H01R 13/648* (2013.01); *H01R 13/2414* (2013.01); *H01R 13/42* (2013.01);
(Continued)

(58) Field of Classification Search
CPC .. H01R 13/648; H01R 13/2414; H01R 13/42; H01R 13/434; H01R 13/516; H01R 13/533; H01R 13/629; H01R 13/652; H01R 13/6581; H01R 13/6588; H01R 13/6597; H01R 43/16; H01R 43/20; H01R 4/26; H01R 4/28; H01R 13/40; H01R 13/41; H01R 13/424; H01R 13/46; H01R 13/53; H01R 13/655; H01R 13/658; H01R 13/6582; H01R 13/6585; H01R 24/86
See application file for complete search history.

(56) References Cited

U.S. PATENT DOCUMENTS 3,003,135 A 10/1961 Purinton
3,825,874 A 7/1974 Peverill
(Continued)

FOREIGN PATENT DOCUMENTS

DE 691 17 543 T2 10/1996
DE 10 2016 213 952 A1 2/2018
(Continued)

*Primary Examiner* — Justin M Kratt
(74) *Attorney, Agent, or Firm* — Seed Intellectual Property Law Group LLP

(57) ABSTRACT

A grounding device, in particular for a contact insert, having a substantially plate-shaped base body made of an electrically conductive material, wherein the base body has at least one passage for a contact, in particular a contact pin, and at least one contact element having a contact surface extending radially outwards. Furthermore, a grounding unit, a contact insert and an electrical plug connector are specified. Furthermore, a method for producing a contact insert is described.

19 Claims, 9 Drawing Sheets

(51) Int. Cl.

| | |
|---|---|
| ***H01R 13/42*** | (2006.01) |
| ***H01R 13/434*** | (2006.01) |
| ***H01R 13/516*** | (2006.01) |
| ***H01R 13/533*** | (2006.01) |
| ***H01R 13/629*** | (2006.01) |
| ***H01R 13/652*** | (2006.01) |
| ***H01R 13/6581*** | (2011.01) |
| ***H01R 13/6588*** | (2011.01) |
| ***H01R 13/6597*** | (2011.01) |
| ***H01R 43/16*** | (2006.01) |
| ***H01R 43/20*** | (2006.01) |
| *H01R 4/26* | (2006.01) |
| *H01R 4/28* | (2006.01) |
| *H01R 13/40* | (2006.01) |
| *H01R 13/41* | (2006.01) |
| *H01R 13/424* | (2006.01) |
| *H01R 13/46* | (2006.01) |
| *H01R 13/53* | (2006.01) |
| *H01R 13/655* | (2006.01) |
| *H01R 13/658* | (2011.01) |
| *H01R 13/6582* | (2011.01) |
| *H01R 13/6585* | (2011.01) |
| *H01R 24/86* | (2011.01) |

(52) U.S. Cl.

CPC ......... *H01R 13/434* (2013.01); *H01R 13/516* (2013.01); *H01R 13/533* (2013.01); *H01R 13/629* (2013.01); *H01R 13/652* (2013.01); *H01R 13/6581* (2013.01); *H01R 13/6588* (2013.01); *H01R 13/6597* (2013.01); *H01R 43/16* (2013.01); *H01R 43/20* (2013.01); *H01R 4/26* (2013.01); *H01R 4/28* (2013.01); *H01R 13/40* (2013.01); *H01R 13/41* (2013.01); *H01R 13/424* (2013.01); *H01R 13/46* (2013.01); *H01R 13/53* (2013.01); *H01R 13/655* (2013.01); *H01R 13/658* (2013.01); *H01R 13/6582* (2013.01); *H01R 13/6585* (2013.01); *H01R 24/86* (2013.01)

(56) References Cited

U.S. PATENT DOCUMENTS

| | | | | | |
|---|---|---|---|---|---|
| 4,362,350 | A | * | 12/1982 | von Harz ............. | H01R 13/426<br>439/744 |
| 4,582,385 | A | | 4/1986 | Couper et al. | |
| 4,979,904 | A | | 12/1990 | Francis | |
| 5,257,949 | A | | 11/1993 | Paulus | |
| 2016/0308289 | A1 | * | 10/2016 | Kumar .................. | H01R 24/86 |
| 2018/0034212 | A1 | | 2/2018 | Quero et al. | |

FOREIGN PATENT DOCUMENTS

| | | | |
|---|---|---|---|
| DE | 10 2018 105 770 | A1 | 9/2019 |
| EP | 3 800 743 | A1 | 4/2021 |
| JP | 2003-31320 | A | 1/2003 |
| WO | 2019/175283 | A1 | 9/2019 |

* cited by examiner

GROUNDING DEVICE, GROUNDING UNIT, CONTACT INSERT AND ELECTRICAL PLUG CONNECTOR, AND METHOD FOR PRODUCING A CONTACT INSERT

BACKGROUND

Technical Field

The disclosure relates to a grounding device, in particular for a contact insert.

Furthermore, the disclosure relates to a grounding unit, as well as a contact insert and an electrical connector.

The disclosure moreover relates to a method for producing a contact insert.

Description of the Related Art

Corresponding devices are known from practice and serve, in particular, for discharging fault currents.

The object of DE 10 2018 105 770 B4 is that of establishing a continuous metal connection between the preferably centrally arranged PE contact (protective earth contact) and the housing, by means of one or more, usually resilient, contact elements. This connection is realized by a separate contact element surrounding the PE contact in a force-fitting manner. The contact with the metal housing is established via spring arms. For this purpose, the connection arrangement is axially pushed into corresponding gaps and openings until the contact formation engages in the openings of the one-piece insulating body.

This solution implicates several disadvantages simultaneously. The complicated mounting of the connection assembly in the insulating body, which can be automated only with difficulty, is obvious. Furthermore, it has been found to be disadvantageous that the connection arrangement, which itself is already complex to produce, has to be introduced deeply into the monolithic contact body such that the contact surfaces of the spring arms can contact the metal housing through an opening of the contact body. This structural solution requires that gaps and openings have to be made in the integrally formed contact body. For this purpose, a slide tool is required, which is correspondingly complex and expensive.

Complicated tool inserts, which are correspondingly sensitive and expensive to produce, are necessary for producing the meticulous gaps and openings in the insulating body. This is also a challenge in terms of injection-molding technology since the gaps protrude very deeply into the insulating body. Due to the necessary flowability of the material required, the selection in the case of flame-retardant plastics materials is limited.

A significant point in plug connectors is the individual design of pin configurations, as well as the contact density and the scalability/miniaturization. The gaps required for receiving the connection arrangement reduce the available space in the pin configuration. Multi-pin or miniaturized plug connectors cannot be realized in this way since these gaps always cross the pin configuration. Thus, the realizable desired pin configuration is always a compromise between the available space conditions and the producibility of the connection assembly.

In the case of a given arrangement, an eccentric placement of the PE contact is difficult to imagine. The connection arrangement must also fulfill the required current load capacity. A parameter for this is to adapt the material thickness. In the known design, this makes the producibility thereof more difficult. The mountability is also more difficult due to more rigid spring arms, and the gaps for receiving the connection arrangement are wider, which rather leads to larger outside diameters than to smaller. Upon further consideration, it is apparent that the connection arrangement has only two contact points to the metal housing, which itself already limits the current load capacity. In addition, the contact points are concave. The resulting, nevertheless very small, total contact surface increases what is known as the end resistance, and this leads to a corresponding significant heating at the contact point in the conductor, when current flows therethrough. It is to be expected that the known construction is already unsuitable for higher fault currents for this reason alone.

All contact points of the known protective conductor device are based on force-fitting connections. In the case of higher fault currents, this leads to an additional heating, which makes damage in the plug connection more probable. Of extreme importance, however, is the contact security even after long lifetimes, in particular the minimum changes in the volume resistance during aging. It should be noted here that the normal contact force remains as constant as possible over time and also no oxidation, which has insulating effect, can occur in the contact region. The connector described in DE 10 2018 105 770 B4 has two different contact points in the current path of the protective device, namely that of the spring arms of the connection arrangement on the metal housing, and the contact point between the protective conductor and the metal housing.

The dependence of the protective conductor contact point on the preload, by the spring arms, of the connection arrangement is problematic here. If the pretension of the spring arms subsides, the normal contact force of the connection tongues will also decrease, which leads overall to large resistance changes.

Furthermore, DE 10 2016 213 952 A1 describes a plug connection part, one or more connecting elements likewise being introduced into an insulating body.

The production of the insulating body is also possible only using a slide tool, the disadvantages of which are already described above. The structure is designed such that the leaf springs are immersed laterally. This has the disadvantage that, due to the space requirement of the receiving pocket, thin wall thicknesses can occur within the insulating bodies, and therefore the desired pin configuration cannot always be realized.

An arbitrary PE arrangement in the pin configuration is difficult or often impossible due to the geometry of the leaf springs, i.e., this construction allows only centrally arranged PE contacts. It is also obvious that the mounting is difficult. An automation of the mounting can be realized at most with considerable effort and high costs. A disadvantage with regard to safety and UL approval is also that the positioning of the leaf spring element is carried out by the plastics insulating body. It is therefore not possible to rule out the possibility that, in the event of a strong fault current, the insulating body may soften, which at least limits the field of application or the function of the protective conductor device.

In contrast to DE 10 2018 105 770 B4, the connecting elements do not surround the PE contact, but rather the contacting of the connecting element and PE contact or the housing is established by blunt contact. Practice has shown that what is known as blunt contact of the contact partners is oxidation-sensitive, in particular if the contact point is not moved over a relatively long time. The possible oxidation layer generally increases the volume resistances, which in turn leads to an increased heating of the contact point in the case of a conductor through which current flows, and possibly promotes damage to plug components.

BRIEF SUMMARY AND GENERAL DESCRIPTION

The present disclosure is directed to a grounding device, a grounding unit and a contact insert and an electrical plug connector designed in such a way that a reliable function, in particular the dissipation of fault currents, is provided with structurally simple means and thus cost-effectively, even under harsh conditions. Furthermore, a method for producing such a contact insert is specified.

According to at least one embodiment of the disclosure, a grounding device, in particular for a contact insert, has a substantially plate-shaped base body made of an electrically conductive material, the base body comprising at least one passage for a contact, in particular a contact pin, and at least one contact element having a contact surface extending radially outwards.

In a manner according to the disclosure, it has first been recognized that a robust grounding device can be produced in a particularly simple manner by way of a substantially plate-shaped base body. Due to the at least one passage, reliable contacting with a contact is made possible, in particular PE contacting. In this case, the contact could be designed as a contact pin. In principle, the grounding device can be used in electrical plug connections with or without shielding. Furthermore, the base body and the at least one contact element can be formed in one piece.

The structural design of the grounding unit according to the disclosure allows a high current load capacity. Thus, larger line cross sections on the contact surfaces of the contact elements or the base body can be realized solely by increasing the material thickness.

In a particularly advantageous manner, the base body can be made of a metal. The volume resistances between the contact points of the base body and an electrically conductive housing touching the base body can be minimized by the shape of the contact points, the normal contact force and the galvanic surface used. This can be realized in an advantageous manner by the base body being produced by a laser cutting method, a punching method and/or a punching and bending method. In general, it is conceivable that the base body is produced from a sheet metal.

The base body is advantageously made of a material which has good spring properties and good electrical conductivity, and also has good thermal conductivity for the purpose of optimized heat dissipation of the grounding unit. This can be, for example, a copper alloy, preferably lead-free CuSN6. The use of other materials, such as spring steels, is also generally conceivable.

Furthermore, the volume resistances of the contact point between the contact, in particular the PE contact, and the base body can be optimized in that a preferably integrally bonded connection is applied there. By way of example, this connection can be established cost-effectively by resistance or laser welding or soldering. A press fit can also be implemented. For this purpose, a sleeve-like edge or projection can advantageously be formed on the passage.

The contact element can advantageously be resilient in the radial direction. This has the advantage that a secure electrical connection to a housing surrounding the grounding device is achieved, for realizing a plug connector. Furthermore, a resilient or flexible configuration of the contact elements makes it possible to reduce too great an oscillation transmission, by vibration or structure-borne noise, by shock stress. Specifically, the contact element can have a spring arm having a free end, and/or a clamp-shaped spring arm. The contact element and the base body can advantageously lie in a common plane. As a result of this design measure, a fault current can be dissipated safely and contact security can be ensured, even in the case of vibrations and shocks which act on the device. Specifically, the at least one contact element can thus be designed to be resilient in the radial direction (for example as a spring arm) and lie in a plane with the base body. A corresponding construction is furthermore particularly simple to produce.

In a further advantageous manner, at least two or at least three contact elements can be formed, preferably symmetrically, in the peripheral direction of the base body. As a result, contact interruptions are avoided, since in the case of a plurality of contact elements at least one or more contact elements are engaged with a housing surrounding the grounding unit.

According to an advantageous embodiment, at least two passages can be formed. Furthermore, it is conceivable that a central passage arranged in the center of the base body and at least three, in particular four or five, further passages, which are arranged, preferably symmetrically, radially outside the center passage, are provided. Thus, both a PE contact and at least one further contact, for example for signal and/or power transmission, can be guided together through the base body, wherein the PE contact can additionally be electrically connected to the base body. The further signal and/or power contacts can be electrically insulated from the base body. The number of passages can be selected according to the desired pin configuration.

With respect to the grounding unit, disclosed herein is grounding unit having a grounding device as described herein and at least one contact, in particular a contact pin, which is arranged in a form-fitting and/or force-fitting and/or integrally bonded manner in and/or on the passage.

The contact, in particular the contact pin, can advantageously serve as a PE contact (protective conductor) or be connected to a protective conductor. The connection of the PE line to the contact or contact pin can take place via a screw clamp connection, crimp connection and/or IDC connection, according to the field of application, even regarding the extreme shock and vibration load, for example during the startup and stopping of industrial motors. However, other types of connection are also conceivable. Alternatively or additionally, the contact can be produced from a copper alloy, preferably lead-free CuZn40. This material has the advantage that it can be crimped. It is also conceivable that the upper surface of the contact and/or the contact surface is nickel-plated, tin-plated or gold-plated, in order to achieve permanently low transition resistances.

Furthermore, it is conceivable that the contact, in particular the PE contact, has a knurling for generating a press fit with the grounding device. Alternatively or additionally, the contact, in particular the PE contact, can have a second knurling. This enables a defined positioning of the contact, in particular in the unshielded version. The second knurling secures the contact if no base body should be provided. The calculated air and creepage paths can thus be maintained.

In a further advantageous manner, the contact can be formed in two parts, wherein a first part can be connected, preferably screwed, to a second part in a form-fitting and/or force-fitting and/or integrally bonded manner. As a result, the contact can be arranged in a particularly simple manner with or on the passage of the base body.

With respect to the contact insert, disclosed herein is a contact insert comprising a grounding unit as described herein, a first insulating body, and a second insulating body, the grounding device being received between the first insulating body and the second insulating body, and the contact surface of the at least one contact element projecting freely.

It has been recognized, in a manner in accordance with the disclosure, that the use of two insulating bodies and a grounding device according to the disclosure makes it possible to use the ideal material for each of the respective individual components.

Advantageously, the first insulating body and the second insulating body can have connecting elements designed to be complementary to one another. This can be, for example, at least one contact dome and at least one contact dome receptacle, in particular for form-fitting and/or force-fitting connection. The outside of the contact dome and the inside of the contact dome receptacle can advantageously extend conically such that they become wedged together when the contact dome is pressed into the contact dome receptacle. Thus, the arrangement can be mounted in a simple manner. The connecting elements, in particular the contact dome and the contact dome receptacle, or at least some of the complementary connecting elements, can be designed such that it extends or they extend through one of the passages. It is also conceivable that a signal and/or power contact is surrounded by at least some of the complementary connecting elements in the region of the passage of the base body. As a result, electrical insulation of the signal and/or power contact with respect to the base body of the grounding device is achieved.

According to a further advantageous embodiment, the first and/or the second insulating body and/or the base body can have clearances which serve as ventilation channels. Thus, heat dissipation is improved.

In a further advantageous manner, the connecting elements can be designed to receive a signal and/or power contact.

With respect to the electrical plug connector, disclosed herein is an electrical plug connector comprising a contact insert as described herein and an electrically conductive housing, the housing surrounding the contact insert at least in part, and the contact surface of the at least one contact element of the contact insert being in electrical contact with the housing.

The plug connector according to the disclosure can be used in a harsh environment and is suitable in particular for use in asynchronous and three-phase motors or other alternating current systems. It is conceivable here to design the plug connector according to the disclosure for transmitting voltages up to 630 V and currents up to 16 A, larger currents also being conceivable. The plug connector is further characterized in that it is extremely reliable, high-performance and space-saving. Robust mechanical properties are also realized, in particular extreme shock and vibration resistance. In addition to a fast and simple mounting in the field, it is achieved that possible electrical accidents, in particular due to vibration-related release of voltage-conducting lines and corresponding insulation faults, are avoided by the grounding unit, since high fault currents are also reliably dissipated accordingly.

In a further manner according to the disclosure, the grounding unit is a completely autonomous assembly. The first and second insulating bodies are not required essentially for fault current dissipation. This has an advantageous effect on the material selection of the first and second insulating bodies as well as on the fulfillment of the standards necessary for approval.

By providing a plug connector according to the disclosure, various variants of electrical accidents can be prevented. If, for example, a fault current reaches the electrically conductive housing due to defective strand insulation of a live line, the fault current flows away via the grounding unit and a PE line connected thereto. Even if the PE contact of an inserted plug connector is not connected, in the present disclosure, the fault current can advantageously be dissipated via the grounding unit contacted with the electrically conductive housing and the device grounding. Thus, the plug connector can also be used to dissipate fault currents via the device grounding without the PE terminal being assigned. Furthermore, a further special feature can be realized by the present disclosure, namely the dissipation of particularly large fault currents. Corresponding dangerous damage to the plug connection is prevented by dividing the fault current through the grounding unit. A portion of the fault current flows away via the PE line of the plug connector, and the other part can flow away via the protective conductor of the device. Due to the structural design of the grounding unit, a parallel path is created via the coupling sleeve or the locking unit, via which a portion of the fault current is dissipated.

According to a preferred embodiment, the electrically conductive housing can be made of metal, in particular a copper alloy, for example a lead-free alloy such as CuZn40, of a hybrid material, i.e., plastics material and metal, or of a metallized plastics material.

The housing can advantageously be designed as a locking device or as a coupling sleeve. The locking device or coupling sleeve is electrically contacted with the grounding unit according to the disclosure, which in turn has the grounding device with the plate-shaped base body and a contact or PE contact. Thus, a first PE contact is in turn electrically connected to the PE line with the complementary PE contact and with its PE line.

In a particularly advantageous manner, only metal components are thus used for contacting or positioning in the fault current paths, said components fulfilling their function reliably and stably even in the case of large heat generation by corresponding fault currents. In contrast to this, plug connectors are known from practice in which the required contact pressure of a PE contact element can be generated only in conjunction with plastics parts. In the case of great heat generation due to correspondingly large fault currents, these can lose their dimensional stability and thus lead to failure of the protective conductor function.

Furthermore, disclosed herein is a method for producing a contact insert, in particular a contact insert as described herein, wherein a first insulating body is introduced into a tool holder, a grounding device being arranged in the correct position, in accordance with its pin configuration, on or in front of the first insulating body, a second insulating body being arranged on or in front of the grounding device, and the first insulating body and the grounding device and the second insulating body being pressed together.

The method sequence according to the disclosure is characterized in that it can be realized with simple operating means. The method could advantageously be carried out manually, for example by way of a knuckle press. This would allow production in the field. The method could also be carried out economically in an automated manner, for example by way of a simple rotary indexing machine and corresponding feeds.

According to an advantageous embodiment of the method, at least one contact, in particular a contact pin, can be connected to the grounding device before the first insulating body and the grounding device and the second insulating body are pressed together. Alternatively or additionally, it is conceivable that at least one contact, in particular a contact pin, is connected to the grounding device after the first insulating body and the grounding device and the second insulating body are pressed together.

Overall, the present disclosure has the advantages that a robust plug connection is specified, which has a particularly good electrical aging resistance, i.e., the volume resistances or the permissible volume resistance changes of the components involved are extremely low over the entire service life, even under the most difficult mechanical and climatic conditions. Furthermore, significant customer requirements, such as the possibility of simple and rapid finishing in the field, space-saving dimensions and a low price are realized.

It is pointed out that, in the above description and the following description of the figures, features and advantages of individual components, for example the grounding device, are described in connection with a larger unit, for example the electrical plug connector. These features and advantages can also be realized by the corresponding component of smaller unit, claimed separately in each case. Corresponding subjects are thus expressly part of the present disclosure.

BRIEF DESCRIPTION OF THE SEVERAL VIEWS OF THE DRAWINGS

There are various possibilities for designing and developing the teaching of the present disclosure in an advantageous manner. In this regard, with the aid of the drawings, reference is made, on the one hand, to the claims subordinate to the main claims and, on the other hand, to the following explanation of preferred embodiments of the disclosure. In connection with the explanation of the preferred exemplary embodiments of the disclosure based upon the drawing, generally preferred embodiments and developments of the teaching are also explained. In the drawings:

In the following description of the figures, the same elements are provided with the same reference numerals. Furthermore, in the figures, in order to improve clarity not all elements are provided with a reference sign in each case.

DETAILED DESCRIPTION

Figure 1:
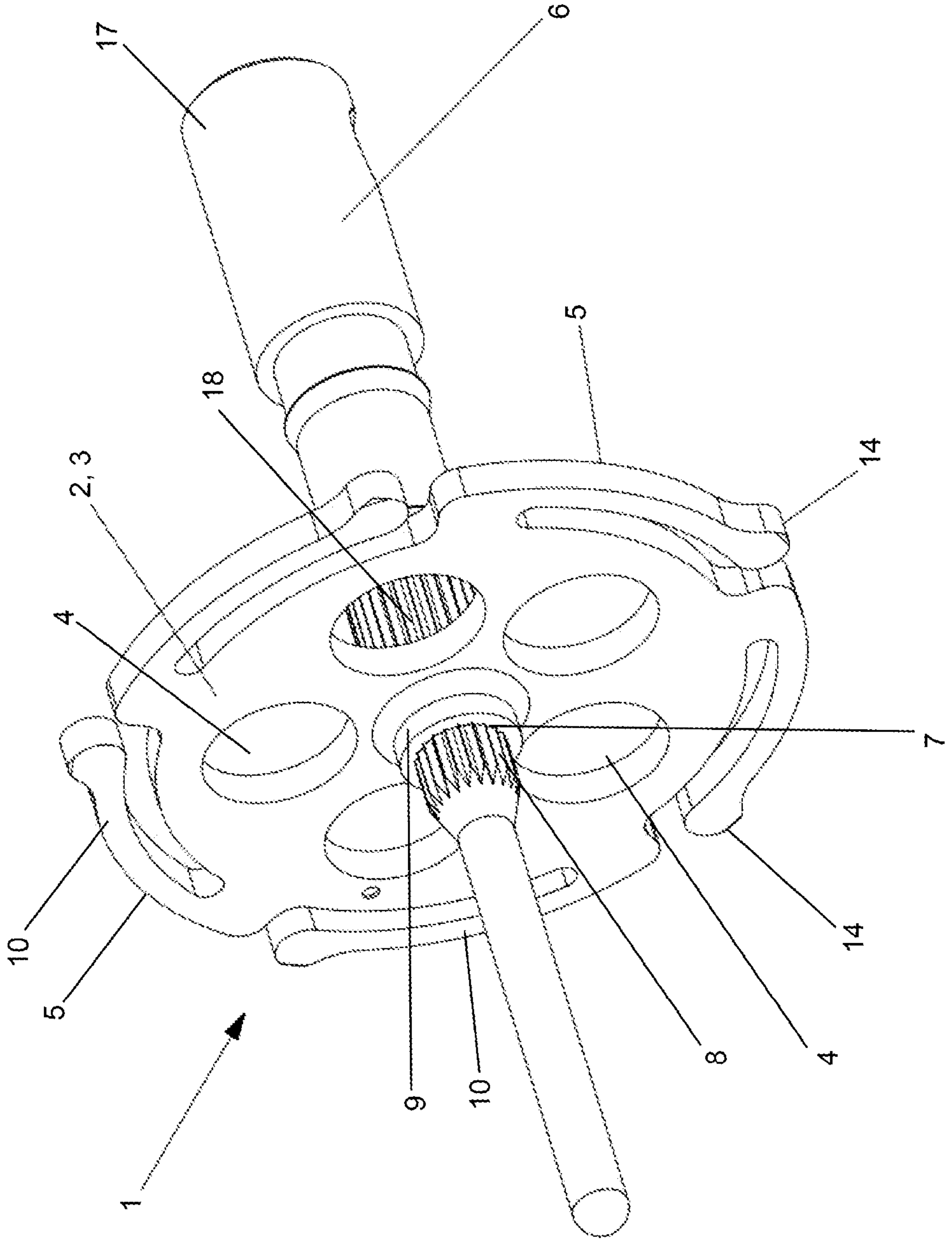
FIG. 1 shows, in a schematic, perspective view, an embodiment of a grounding unit according to the disclosure.

FIG. 1 shows, in a schematic, perspective view, an embodiment of a grounding unit 1 according to the disclosure. The grounding unit 1 comprises a grounding device 2 having a plate-shaped base body 3, which has a plurality of passages 4 and multiple contact elements 5, as well as an electrical contact 6. The contact 6 is arranged in the central passage 7 of the base body 3 via a press fit. In order to realize a permanent and robust connection, the contact 6 has a knurling 8, and a projection 9 is formed on the base body 3. When the contact 6 is pressed in, the material tips of the knurling 8 are displaced into the depressions, such that a pre-existing defect caused by crack formation in the cylindrical pressing region on the base body 3 is avoided. Thus, higher pressing forces can be realized, which in turn leads to lower transition resistances.

The contact 6 has a screw clamp connection, in order to establish a connection with a conductor, in particular a PE conductor. However, other types of connection are also conceivable, for example crimping, performing soldering or establishing a cage clamp connection.

The contact elements 5 are realized as spring arms 10, which are designed to be resilient outward in the radial direction. If a PE conductor is connected to the contact 6, a fault current can be dissipated to an electrically conductive housing 15 surrounding the grounding unit 1, via the contact surfaces 14 of the electrically conductive base body 3 formed on the contact elements 5.

Further signal and/or power contacts can be guided through the further passages 4 arranged symmetrically around the central passage 7. The number of passages 4 and the positioning of the contact 6 for the PE conductor in the base body 3 can be selected according to the desired pin configuration.

Forms on the base body 3 which serve as spacers between the two thermally insulating bodies, in order to promote the heat dissipation, are not shown.

Figure 2:
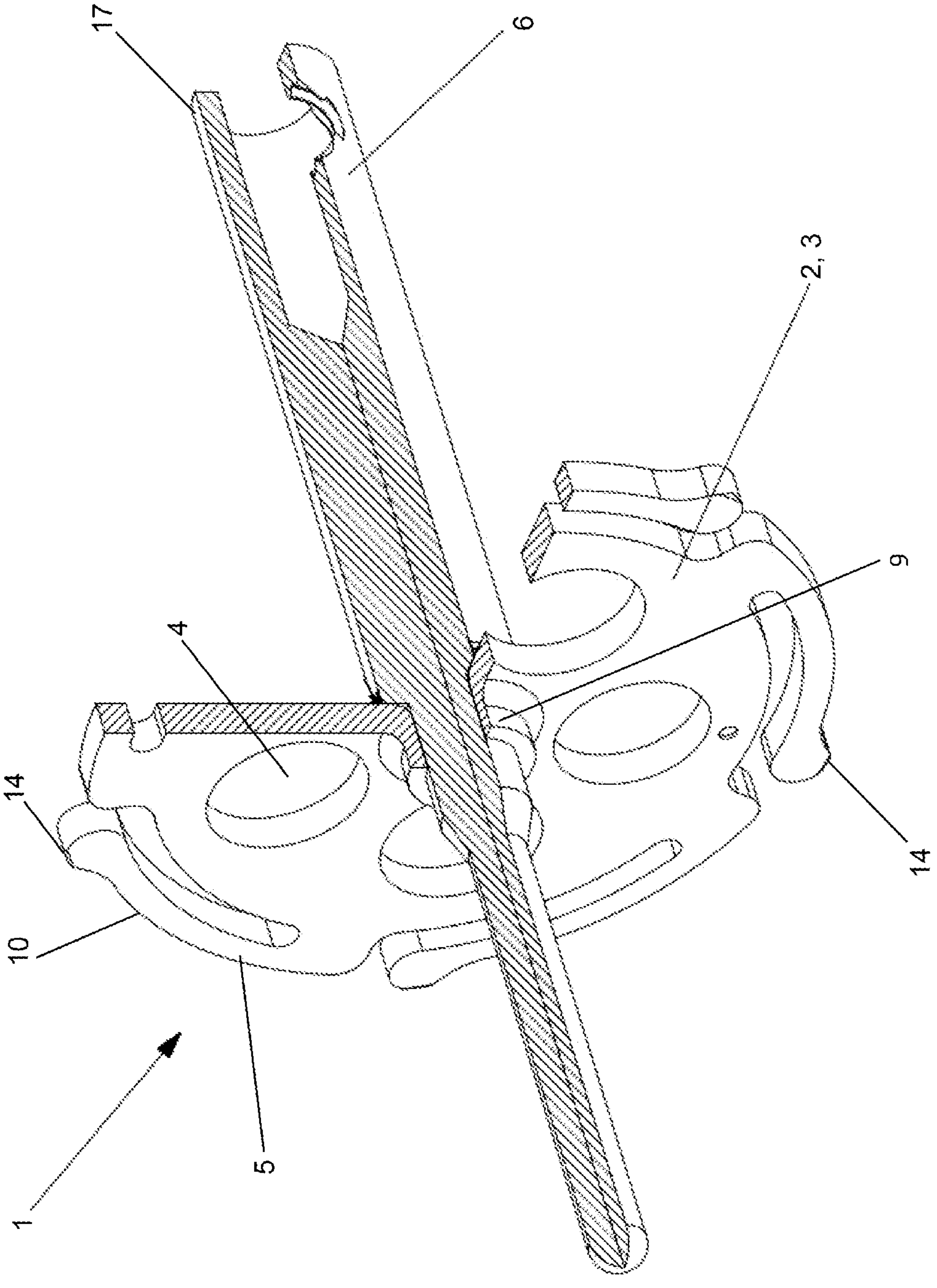
FIG. 2 shows, in a schematic, perspective, partially cutaway view, a further embodiment of a grounding unit according to the disclosure.

FIG. 2 shows another embodiment of a grounding unit 1 according to the disclosure. This substantially corresponds to the embodiment according to FIG. 1, such that reference is made to the above description. The essential difference is that the contact 6 is integrally bonded to the base body 3. For example, it can be a welded or soldered connection.

In this case, the base body 3 has a projection 9, which does not necessarily have to be formed, however. It may be sufficient to weld or solder the contact 6 to the base body 3.

Figure 3:
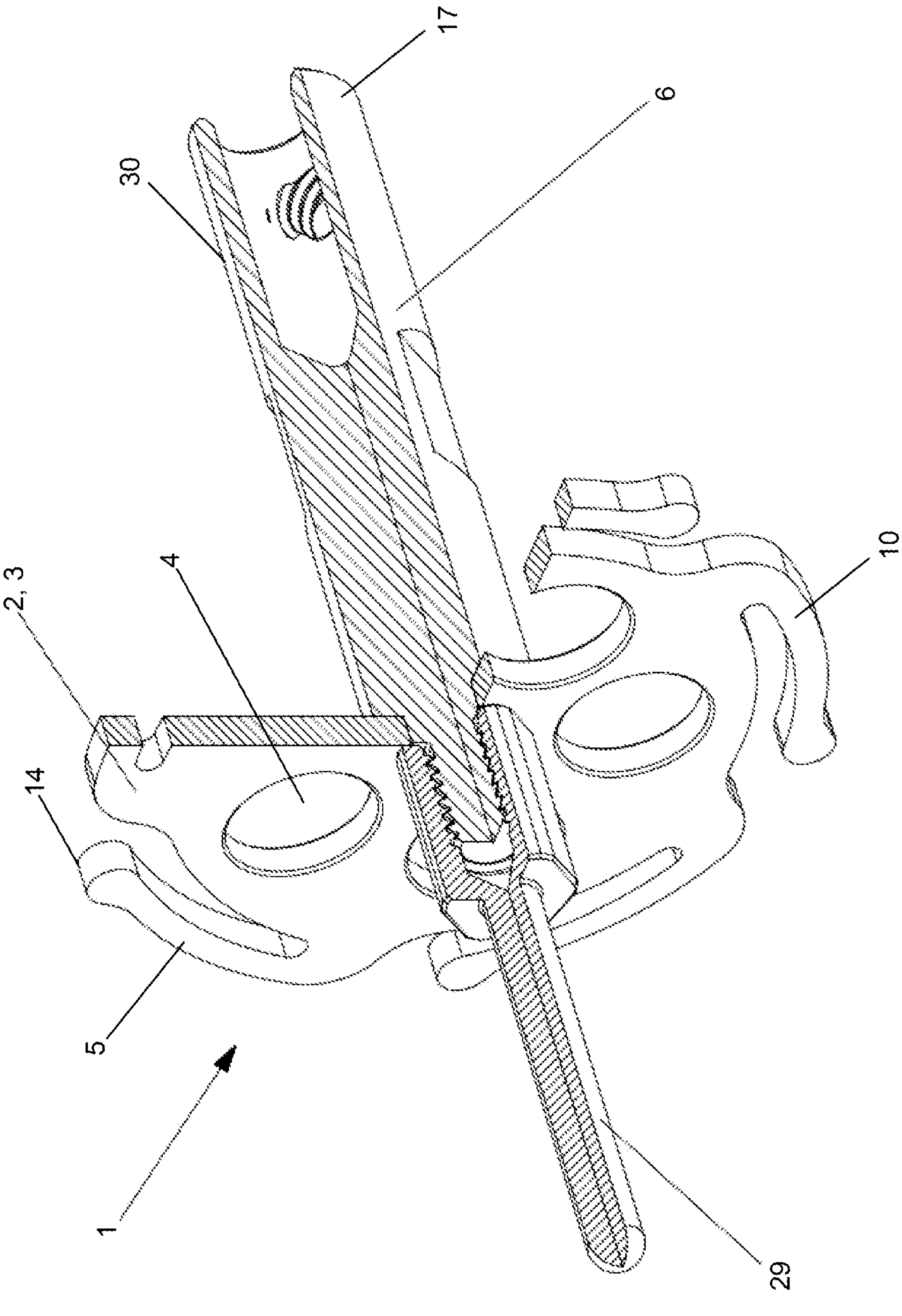
FIG. 3 shows, in a schematic, perspective, partially cutaway view, a further embodiment of a grounding unit according to the disclosure.

FIG. 3 shows another embodiment of a grounding unit 1 according to the disclosure. This substantially corresponds to the embodiment according to FIG. 1, such that reference is made to the above description. The essential difference is that the contact 6 is formed in two parts. In this case, the first part 29 has an internal thread into which an external thread of the second part 30 can be screwed, the first part 29 and the second part 30 each engaging behind on one side of the base body 3, such that a mechanical and electrical connection is created. It is also conceivable for the first part 29 to have an external thread which can be screwed into an internal thread of the second part 30.

Figure 4:
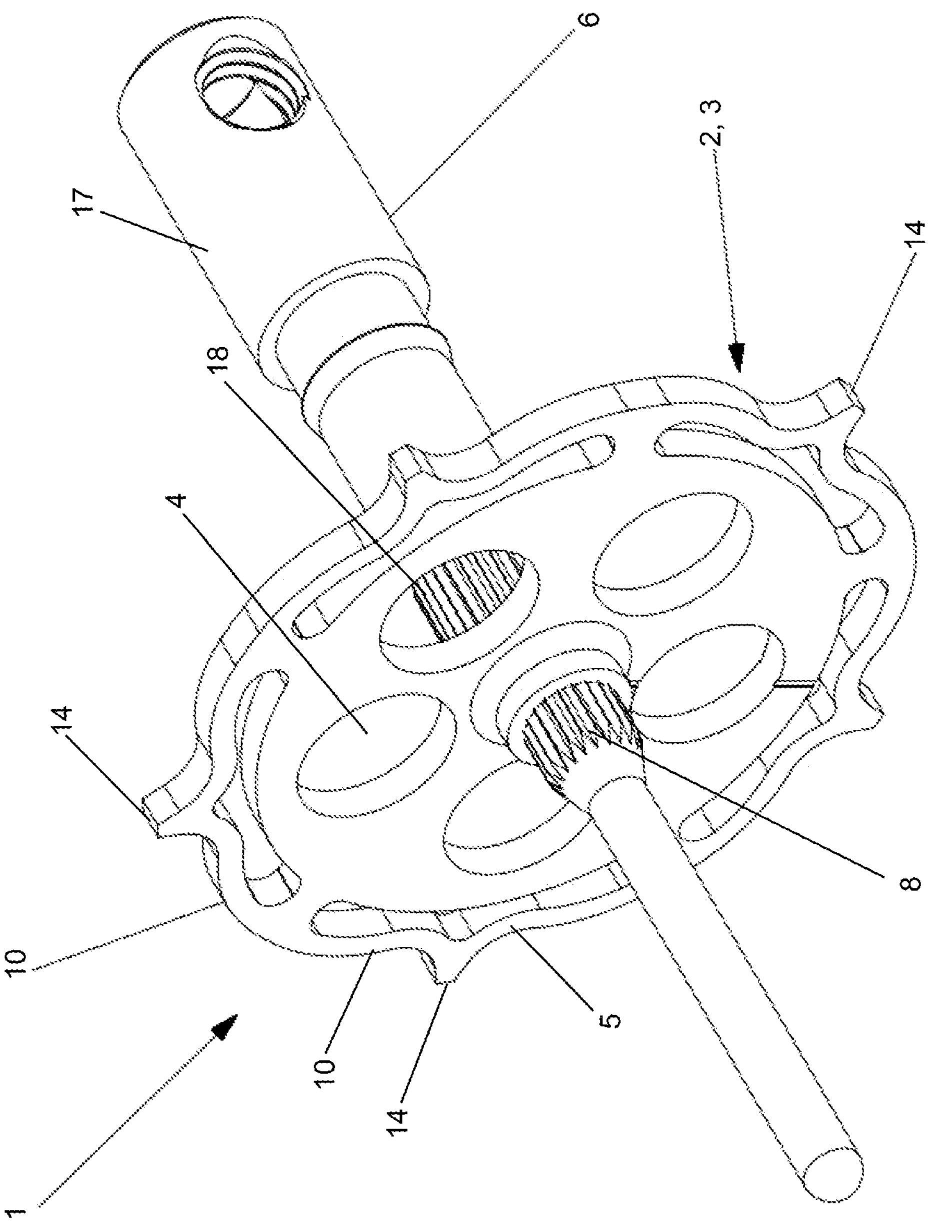
FIG. 4 shows, in a schematic, perspective view, a further embodiment of a grounding unit according to the disclosure.

FIG. 4 shows another embodiment of a grounding unit 1 according to the disclosure. This substantially corresponds to the embodiment according to FIG. 1, such that reference is made to the above description. The essential difference is that the contact elements 5 are designed as a clamp-like closed spring arms 10. This embodiment is characterized in that a particularly high contact force can be achieved permanently in the radial direction. In this case, it is conceivable that the contact 6 is designed according to one of the embodiments of FIG. 2 or 3 and is connected to the base body 3.

Figure 5:
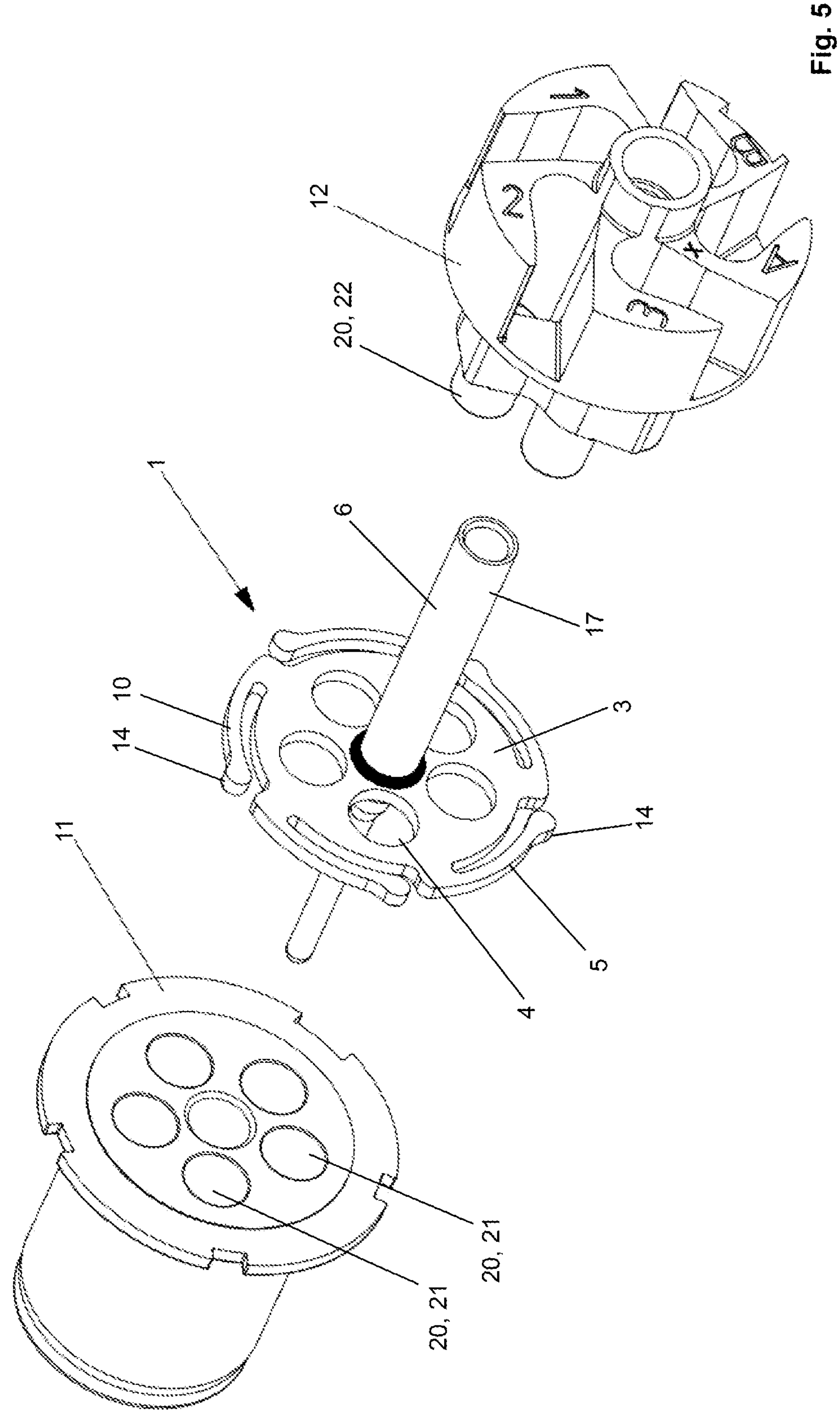
FIG. 5 shows, in a schematic, perspective, exploded view, an embodiment of a contact insert according to the disclosure.

FIG. 5 shows, in a schematic, perspective, exploded view, an embodiment of a contact insert 13 according to the disclosure. It has a first insulating body 11 and a second insulating body 12, between which a grounding unit 1 is arranged. In this case, the grounding unit 1 corresponds to the embodiment according to FIG. 2, which can be any grounding unit 1 according to the disclosure, for example according to FIG. 1, 3, or 4.

It is significant that the contact surfaces 14 of the contact element 5 are not covered in the radial direction, i.e., they protrude freely, such that contact with an electrically conductive housing 15 (not shown) is possible.

Furthermore, complementary connecting elements 20 are formed on the first and second insulating bodies 11, 12, namely contact dome receptacles 21 and contact domes 22. A form-fitting and force-fitting connection is thus created when the contact domes 22 are inserted through the passages 4 into the contact dome receptacles 21. In this case, the electrical contact 6 serving as the PE contact 17 does not necessarily have to be arranged in the central passage 7, but can also be positioned in one of the other passages 4, depending on the desired pin configuration.

Figure 6:
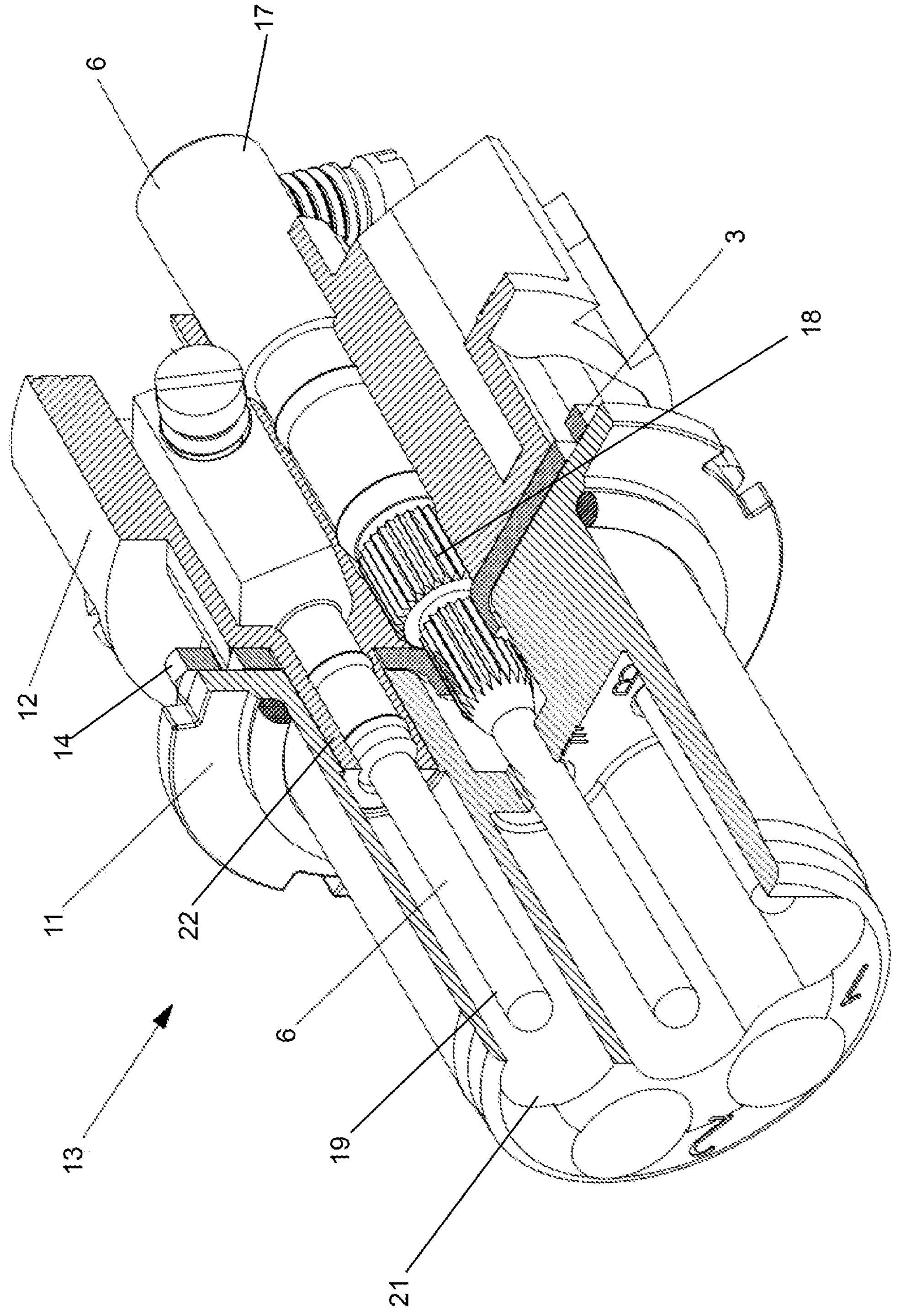
FIG. 6 shows, in a schematic, perspective, partially cutaway view, a further embodiment of a contact insert according to the disclosure.

FIG. 6 shows a further embodiment of a contact insert 13 according to the disclosure, which is realized as a pin insert. It has a first insulating body 11, a second insulating body 12 and a grounding unit 1 arranged therebetween. In this case, a contact 6 serving as a PE contact 17 is arranged in the central passage 7, which contact is connected to the base body 3 by way of a press fit, according to the embodiment of FIG. 1. In this case, this contact 6 can also be connected to the base body 3 in another way, for example according to one of the embodiments of FIGS. 2 to 4. The contact 6 has a second knurling 18, with which it engages on the second insulating body 12, such that improved positioning is achieved.

Furthermore, a further contact 6 serving as a signal and/or power contact 19 is arranged, which is surrounded by the connecting element 20 of the second insulating body 12 in the region of the passage 4 of the base body 3. This contact 6 is thus electrically insulated with respect to the base body 3. In order to securely hold this contact 6 in the second insulating body 12, elevations 23 or contact claws extending in the peripheral direction are formed on the contact 6. The insulating bodies 11, 12 are pressed against each other such that the contact domes 22 engage in the contact receiving domes 21 and realize a force-fitting or form-fitting connection.

It is significant that the contact surfaces 14 of the base body 3 are not enclosed by the insulating bodies 11, 12 and thus protrude freely. Therefore, they can be brought into electrical contact 6 with an electrically conductive housing 15 when this is arranged around the contact insert 13. Thus, fault currents can be discharged in a safe manner.

Furthermore, clearances 16 are formed on the second insulating body 12, which allow the heat produced as a result of a fault current to escape, or discharge the greatly heated air.

Figure 7:
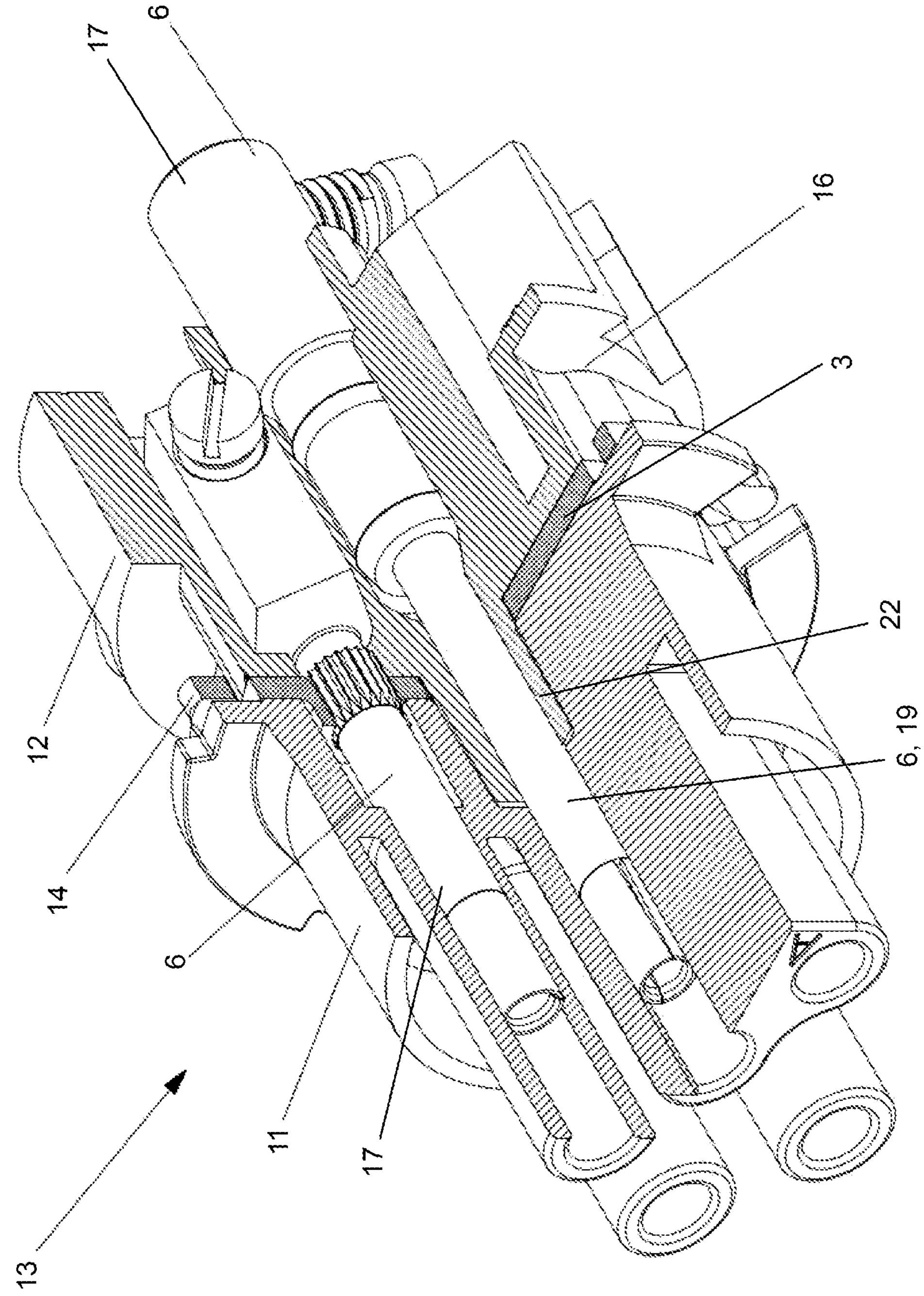
FIG. 7 shows, in a schematic, perspective, partially cutaway view, a further embodiment of a contact insert according to the disclosure.

FIG. 7 shows another embodiment of a contact insert 13 according to the disclosure. It substantially corresponds to the embodiment according to FIG. 6, such that reference is made to the above description. The essential difference is that the contact insert 13 is designed as a socket insert and not as a pin insert, and that the PE contact 17 is arranged eccentrically, whereas the signal and/or power contact 19 extends through the central passage 7 of the base body 3.

Figure 8:
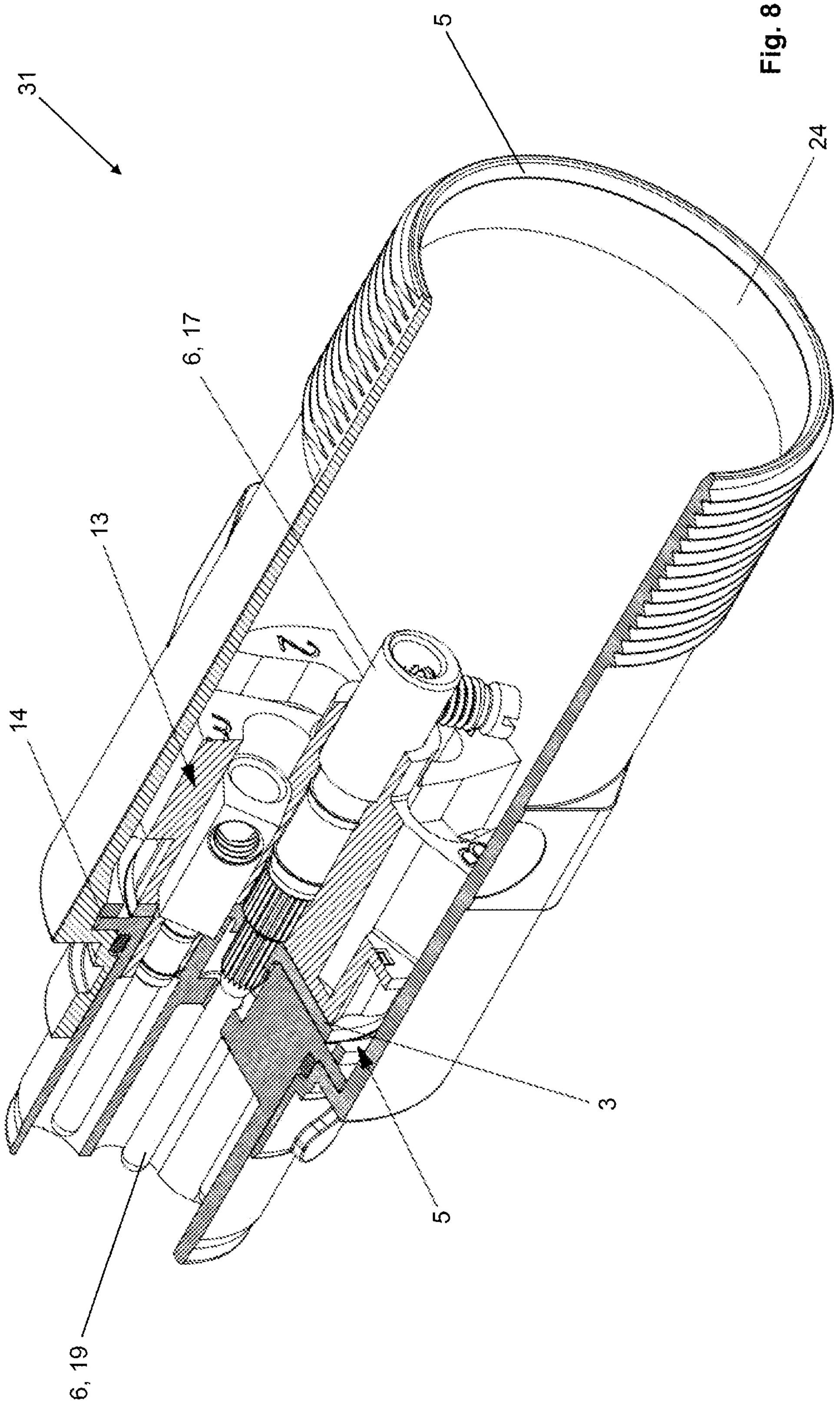
FIG. 8 shows, in a schematic, perspective, partially cutaway view, an embodiment of an electrical plug connector according to the disclosure.

FIG. 8 shows an embodiment of an electrical plug connector 31 according to the disclosure. It has a contact insert 13 according to FIG. 6, which is surrounded by an electrically conductive housing 15 designed as a coupling sleeve 24. It can be clearly seen here that the contact surfaces 14 of the contact elements 5 designed as spring arms 10 rest against the coupling sleeve 24, such that electrical contacting exists between the coupling sleeve 24 and the PE contact 17, via the base body 3. The coupling sleeve 24 represents a component of a locking unit in the can version.

The contact point of the base body 3 and the coupling sleeve 24 is thus realized by pressing the spring arms 10 arranged radially on the base body 3. The transition resistance between these components is substantially dependent on the contact force or the shape of the contact surface 14 of the contact element 5. In order to further minimize this transition, welding of these spring arms 10 to the coupling sleeve 24 is conceivable in principle. For this purpose, two half-shell-shaped welding cathodes surround the coupling sleeve 24 and a second is realized by the PE contacting.

In this way, the transition resistances are minimized once again. The flexible connection between the base body 3 and the coupling sleeve 24, which is indispensable in the case of shock and vibration, is maintained when only the contact surfaces 14 are welded and the oscillations are damped by the spring arms 10.

Figure 9:
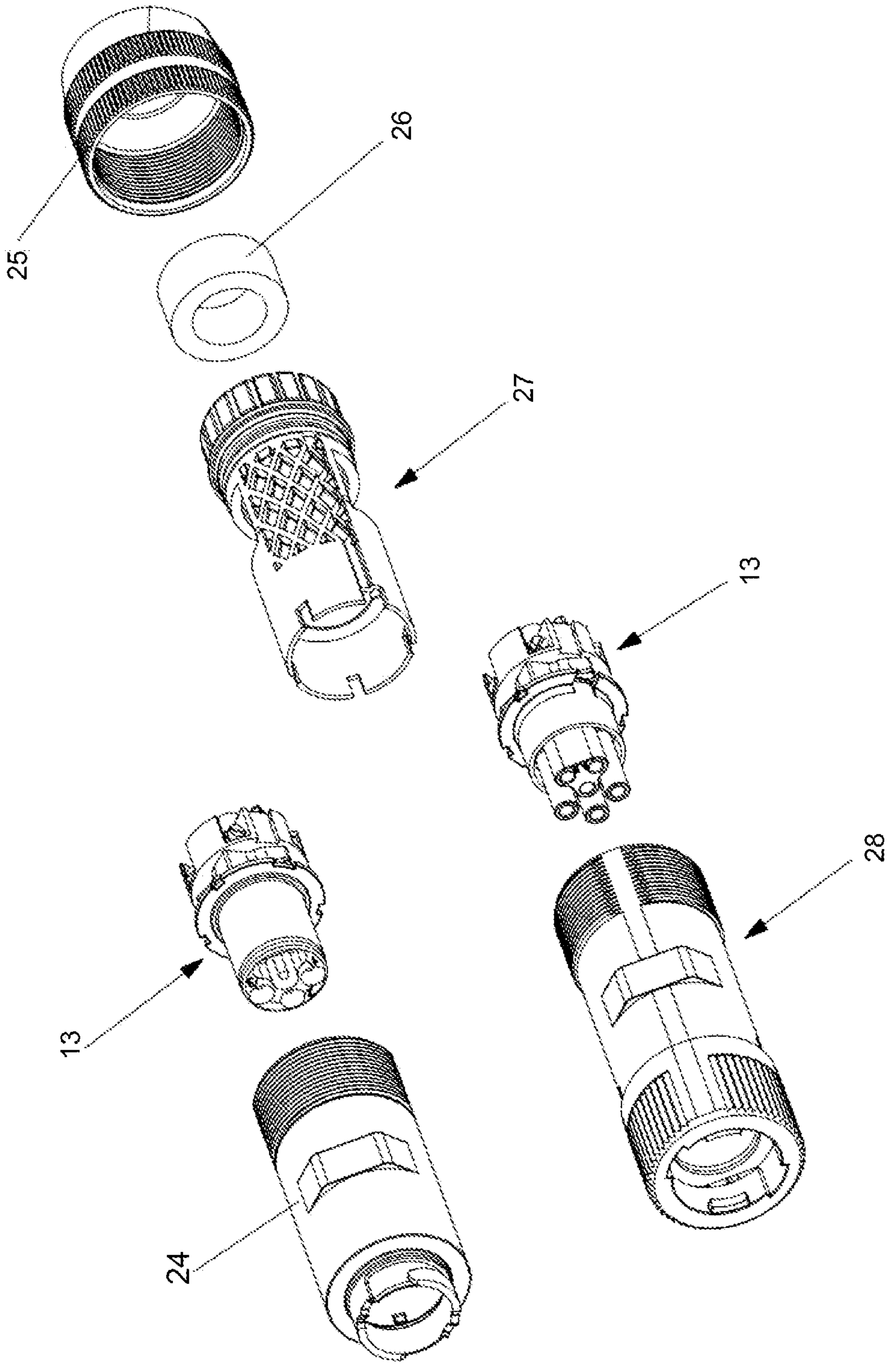
FIG. 9 shows, in a schematic, perspective, exploded view, two embodiments of electrical plug connectors according to the disclosure.

FIG. 9 shows two embodiments of electrical plug connectors 31 according to the disclosure. In this case, the top embodiment describes a pin design, the bottom embodiment describes a socket design.

For the purpose of finishing, the pressure screw 25, the sealing ring 26 and the spacer sleeve 27 are initially threaded onto a cable. The cable is already or is now stripped, the insulation is stripped off the wires, and the strands are connected. Finally, the spacer sleeve 27 is pushed onto the insulating body and the sealing ring is pressed into the injection-molded clamping basket of the spacer sleeve 27.

This assembly, pre-mounted in this way, is inserted into the locking device 28 or into the coupling sleeve 24. Care must be taken here that the contact insert 13 is pushed up to the stop. Finally, the pressure screw 25 is screwed on.

With regard to other advantageous embodiments of the teaching according to the disclosure, in order to avoid repetition, reference is made to the general part of the description and also to the accompanying claims.

Finally, it is expressly pointed out that the embodiments, described above, of the teaching according to the disclosure serve only to explain the claimed teaching, but do not limit it to the embodiments.

LIST OF REFERENCE SIGNS

1 Grounding unit
2 Grounding device
3 Base body
4 Passage
5 Contact element
6 Contact
7 Central passage
8 Knurling
9 Projection
10 Spring arm
11 First insulating body

12 Second insulating body
13 Contact insert
14 Contact surface
15 Housing
16 Clearance
17 PE contact
18 Second knurling
19 Signal and/or power contact
20 Connecting element
21 Contact dome receptacle
22 Contact dome
23 Elevation
24 Coupling sleeve
25 Pressure screw
26 Sealing ring
27 Spacer sleeve
28 Locking device
29 First part
30 Second part
31 Plug connector The various embodiments described above can be combined to provide further embodiments. All of the patents and publications referred to in this specification and/or listed in the Application Data Sheet are incorporated herein by reference, in their entirety. Aspects of the embodiments can be modified, if necessary to employ concepts of the various patents and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A grounding device, comprising:
a substantially plate-shaped base body made of an electrically conductive material, wherein the base body has at least one passage for a contact; and
at least one contact element having a contact surface extending outwards in a radial direction from the base body,
wherein the at least one contact element and the base body lie completely in a common plane, and
wherein the at least one contact element is resilient only in the radial direction.

2. The grounding device according to claim 1, wherein at least two contact elements are formed in a peripheral direction of the base body.

3. The grounding device according to claim 2, wherein the at least two contact elements are formed symmetrically in the peripheral direction of the base body.

4. The grounding device according to claim 1, wherein at least two passages are formed.

5. The grounding device according to claim 4, wherein the at least two passages include a central passage arranged in a center of the base body and at least three further passages arranged radially outside the central passage.

6. A grounding unit having a grounding device according to claim 1, further comprising at least one contact arranged in a form-fitting and/or force-fitting and/or integrally bonded manner in and/or on the at least one passage.

7. The grounding unit according to claim 6, wherein the at least one contact is a protective earth (PE) contact.

8. The grounding unit according to claim 6, wherein the at least one contact has a knurling for generating a press fit with the grounding device.

9. The grounding unit according to claim 6, wherein the at least one contact comprises two parts, a first part that is connectable to a second part in a form-fitting and/or force-fitting and/or integrally bonded manner.

10. A contact insert having a grounding unit according to claim 6, further comprising:
a first insulating body; and
a second insulating body,
wherein the grounding device is received between the first insulating body and the second insulating body, and
wherein the contact surface of the at least one contact element projects freely.

11. The contact insert according to claim 10, wherein the first insulating body and the second insulating body have connecting elements configured to have a form-fitting and/or force-fitting connection.

12. The contact insert according to claim 11, wherein the connecting elements are configured to receive a signal and/or power contact.

13. The contact insert according to claim 11, wherein the connecting elements include at least one contact dome and at least one contact dome receptacle that are complementary to one another.

14. An electrical plug connector having a contact insert according to claim 10, further comprising an electrically conductive housing, wherein the electrically conductive housing surrounds the contact insert at least in part, and wherein the contact surface of the at least one contact element of the contact insert is in electrical contact with the electrically conductive housing.

15. The electrical plug connector according to claim 14, wherein the electrically conductive housing is configured as a locking device or as a coupling sleeve.

16. A method for producing a contact insert according to claim 10, comprising:
introducing the first insulating body into a tool holder;
arranging the grounding device in a correct position in accordance with its pin configuration, on or in front of the first insulating body;
arranging the second insulating body on or in front of the grounding device; and
pressing the first insulating body, the grounding device, and the second insulating body together.

17. The method according to claim 16, further comprising:
connecting the at least one contact to the grounding device before pressing the first insulating body, the grounding device, and the second insulating body together, and/or
connecting the at least one contact to the grounding device after pressing the first insulating body, the grounding device, and the second insulating body together.

18. The grounding device according to claim 1, wherein the grounding device is for a contact insert, and the contact is a contact pin.

19. The grounding device according to claim 1, wherein the at least one contact element has a spring arm having a free end, and/or has a clamp-shaped spring arm.

* * * * *